(12) United States Patent
Charpentier et al.

(10) Patent No.: US 10,041,827 B2
(45) Date of Patent: Aug. 7, 2018

(54) IMAGE GUIDED SCALE CALIBRATION

(71) Applicant: NCR Corporation, Duluth, GA (US)

(72) Inventors: Peter R. Charpentier, Suwanee, GA (US); Jason Rambler, Decatur, GA (US)

(73) Assignee: NCR Corporation, Atlanta, GA (US)

( * ) Notice: Subject to any disclaimer, the term of this patent is extended or adjusted under 35 U.S.C. 154(b) by 203 days.

(21) Appl. No.: 14/976,826

(22) Filed: Dec. 21, 2015

(65) Prior Publication Data

US 2017/0176241 A1 Jun. 22, 2017

(51) Int. Cl.
*G01G 23/01* (2006.01)

(52) U.S. Cl.
CPC .................. *G01G 23/01* (2013.01)

(58) Field of Classification Search
CPC ................ G01G 19/4144; G01G 23/01
See application file for complete search history.

(56) References Cited

U.S. PATENT DOCUMENTS

| 4,751,661 | A | * | 6/1988 | Amacher | G01G 23/01 177/3 |
| 4,760,539 | A | * | 7/1988 | Amacher | G01G 23/01 177/3 |
| 4,848,477 | A | * | 7/1989 | Oldendorf | G01G 23/01 177/25.14 |
| 4,909,338 | A | * | 3/1990 | Vitunic | G01G 23/01 177/164 |
| 5,640,334 | A | * | 6/1997 | Freeman | G01G 23/015 177/1 |
| 6,005,959 | A | * | 12/1999 | Mohan | G01B 11/024 348/89 |
| 6,080,938 | A | * | 6/2000 | Lutz | G01G 23/166 177/25.15 |
| 6,779,722 | B1 | * | 8/2004 | Mason | A47F 9/046 235/375 |
| 6,794,586 | B1 | * | 9/2004 | Mason | G01G 19/4144 177/185 |
| 7,040,455 | B2 | * | 5/2006 | Bogat | A47F 9/047 177/25.15 |
| 7,347,367 | B2 | * | 3/2008 | White | G01G 19/4144 186/61 |
| 7,909,248 | B1 | * | 3/2011 | Goncalves | G07G 1/0063 235/375 |
| 8,430,311 | B2 | * | 4/2013 | Ostrowski | A47F 9/047 235/383 |
| 8,474,715 | B2 | * | 7/2013 | Goncalves | G07G 1/0063 235/383 |

(Continued)

*Primary Examiner* — Randy Gibson
(74) *Attorney, Agent, or Firm* — Schwegman, Lundberg & Woessner

(57) ABSTRACT

Various embodiments herein each include at least one of devices, methods, and software for image guided scale calibration. One embodiment, in the form of a method, includes outputting an instruction to place a first weight on a scale being calibrated at a particular location and capturing at least one image of the weight when placed on the scale. The method then processes a captured image of a weight when placed on the scale to determine whether the weight is the first weight and whether the weight is at the particular location. When the weight placed on the scale is not the first weight or the weight is not at the particular location, the method performs a remedial action.

20 Claims, 3 Drawing Sheets

(56) References Cited

U.S. PATENT DOCUMENTS

| | | | | |
|---|---|---|---|---|
| 8,571,298 B2* | 10/2013 | McQueen | ............... | G06K 9/00 |
| | | | | 235/378 |
| 8,876,001 B2* | 11/2014 | Herwig | ................ | G07G 1/009 |
| | | | | 235/375 |
| 9,679,327 B2* | 6/2017 | Herring | ............. | G06Q 30/0633 |
| 2005/0097064 A1* | 5/2005 | Werden | ............. | G01G 19/4144 |
| | | | | 705/400 |
| 2010/0139989 A1* | 6/2010 | Atwater | ............ | G01G 19/4144 |
| | | | | 177/245 |
| 2011/0129117 A1* | 6/2011 | Ross | ................... | G06K 9/2018 |
| | | | | 382/103 |
| 2015/0082857 A1* | 3/2015 | Reed | ..................... | G01G 23/01 |
| | | | | 73/1.13 |
| 2016/0217449 A1* | 7/2016 | Takeno | ............... | G06Q 20/208 |

* cited by examiner

IMAGE GUIDED SCALE CALIBRATION

BACKGROUND INFORMATION

One of the most complicated and often confusing procedures for scanner/scales is the calibration process. Today, users are asked to place specific weights on the scale top plate in a very specific order, and those weights must be placed in very specific locations on the scale top plate. For example, the scanner may tell the user to place a five-pound weight on the top plate. By reading the user guide, the user will find that the weight needs to be placed in the center of the top plate. Then the user is instructed to add a ten-pound weight to the scale top plate. An experienced user will know to stack the five-pound weight on the ten-pound weight, and place them in the center. This process continues with varying increments of weight, added in at specific locations and in a specific order. Additionally, between each step, the user must confirm they have done the required step by pressing the scale zero button. All of this leaves a lot of room for error.

SUMMARY

Various embodiments herein each include at least one of devices, methods, and software for image guided scale calibration. One embodiment, in the form of a method, includes outputting an instruction to place a first weight on a scale being calibrated at a particular location and capturing at least one image of the weight when placed on the scale. The method then processes a captured image of a weight when placed on the scale to determine whether the weight is the first weight and whether the weight is at the particular location. When the weight placed on the scale is not the first weight or the weight is not at the particular location, the method performs a remedial action.

Another embodiment, in the form of a method includes entering a scale calibration process, outputting an audio instruction to place a first weight on the scale at a particular location, and detecting placement of a weight on the scale. This method then captures at least one image of the weight placed on the scale and processes the image to determine whether the weight placed on the scale is the first weight and whether the weight is at the particular location. When the weight placed on the scale is the first weight and the weight is at the particular location, this method proceeds in the scale calibration process. Otherwise, when the weight placed on the scale is not the first weight or the weight is not at the particular location, the method includes performing a remedial action.

A further embodiment, in the form of a scale device includes a scale, a processor and a memory, at least one imaging device, and an output device, such as a speaker, a display, or a combination of output devices. The scale device of such embodiments further includes scale calibration process instructions stored in the memory and executable by the processor to perform data processing activities. The data processing activities include outputting an instruction via the output device to place a first weight on the scale at a particular location and capturing at least one image by the at least one imaging device of the weight when placed on the scale. The data processing activities further include processing a captured image of a weight when placed on the scale to determine whether the weight is the first weight and whether the weight is at the particular location. When the weight placed on the scale is not the first weight or the weight is not at the particular location, the data processing activities include performing a remedial action. However, when the weight is the first weight and is at the particular location, the data processing activities include proceeding in the scale calibration process.

DETAILED DESCRIPTION

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Figure 1:
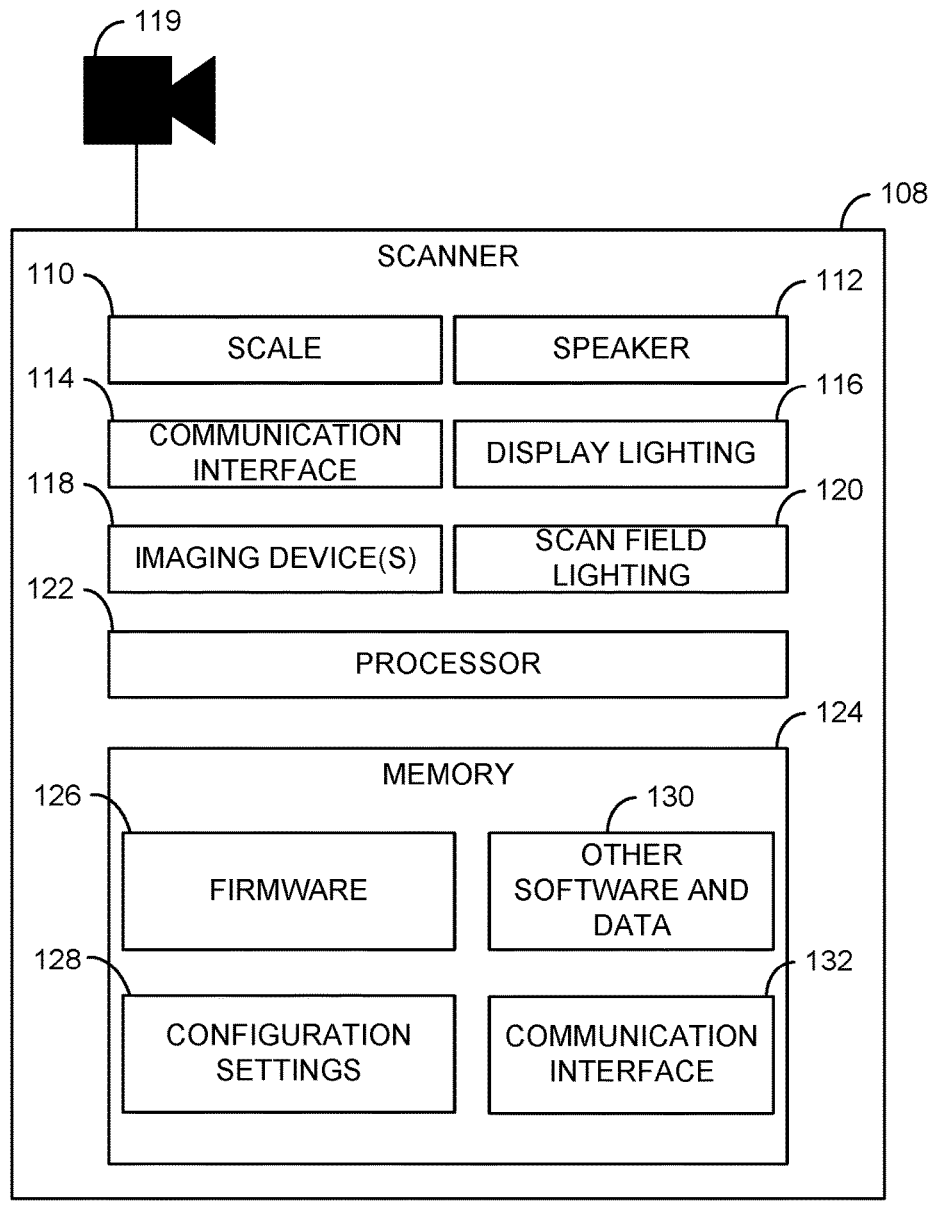
FIG. 1 is a block diagram illustrating the components of a product scanner/scale, according to an example embodiment.

FIG. 1 is a diagram illustrating components of a product scanner/scale 108 that may be deployed at a checkout station such as a POS terminal, self-service terminal (SST), or other kiosk system including a scanner/scale 108 according to an example embodiment. It is to be noted that the scanner/scale 108 is shown schematically in greatly simplified form, with example components relevant to understanding various embodiments herein. Note that the scanner/scale 108 may include more or fewer components in some embodiments.

Furthermore, the various components included in the FIG. 1 as illustrated and arranged are provided for illustration purposes only. It is to be noted that other arrangements with more or fewer components are possible without departing from the contributions herein, in particular with regard to secure image processing.

Moreover, the methods and scanner/scale 108 presented herein and below may include all or some combination of the components described and shown in the various contexts herein. Further, although the scanner/scale 108 may be paired with a POS terminal, the scanner/scale 108 may be a standalone element or an element of other systems, devices, and terminals in other embodiments. Examples of other terminal-types that may include a scanner/scale 108 are SSTs, clerk operated and self-service library checkout stations, time-keeping terminals, and the like. Additionally, although a scanner is illustrated in FIG. 1 according to some embodiments, the image guided scale calibration described herein may also be implemented with regard to images and video streams generated by other devices, such as stand-alone cameras. Further, although FIG. 1 refers to the scanner/scale 108 as a "scanner/scale", other terms may be equally used herein and in the claims, such as "scanner" and other terms may be used to refer to the same device where a scale is integrated within a scanner having cameras or a scale that is separate from a scanner but includes one or more cameras deployed therewith.

The methods of some embodiments are programmed as executable instructions in memory and/or non-transitory computer-readable storage media and executed on one or more processors associated with the components and devices herein. For example, some embodiments may be deployed as firmware present within the scanner/scale 108, such as firmware 126, or within another device such as a computer or imaging device of a POS terminal coupled to the scanner/scale 108. In other embodiments, the image guided scale calibration process may be deployed as software on the scanner/scale 108, a computer of a POS terminal or other terminal, with a network service that receives data from the scanner/scale 108 or other imaging device, in a device driver, and the like.

The scanner of the scanner/scale 108 may be referred to as a product scanner or barcode scanner as that is the task most commonly associated with such devices. During operation, items are placed within a scan field of the scanner/scale 108. One or more imaging devices 118 of the scanner/scale 108 and one or more external imaging devices 119 that may be present in some embodiments, such as one or more cameras, then scan a barcode and information read therefrom is communicated to a POS system. The POS system then uses that data to identify the item placed within the scan field of the scanner/scale 108 and performs an additional function. The additional function may include a price lookup and addition of the item to a list of items to be purchased, which may be presented on the one or more POS displays.

The scanner/scale 108 may include one or more scan fields, such as two scan fields of bi-optic scanners that are commonly seen in grocery and discount retail outlets. In addition to the imaging devices 118, the scanner/scale 108 may include various other components. The various other components may include an integrated scale 110 such as may be used in a grocery outlet to weigh produce and one or both of a speaker 112 and display lighting 116 to output audio and visual signals, such as signals of (un)successful scans and voice commands while performing a scale 110 calibration process, such as an image guided scale calibration process. The scanner/scale 108 may also include scan field lighting 120 that may be turned on and off and adjusted based on a detected presence of an item to be scanned.

During typical operation, the scanner/scale 108 is operated according to instructions executed on a processor 122. The processor 122 may be an application integrated circuit (ASIC), digital signal processor, microprocessor, or other type of processor. The instructions may be firmware 126 or software 130 stored in one or more memories 124. The one or more memories 124 may be or include volatile and non-volatile memories, write-protected memories, write-once memories, random access memory (RAM), read only memories (ROM), secure memory, and other memory and data storage types and devices.

The instructions as may be stored in firmware 126 or as software 130 in memory 124 are often executed according configuration settings stored in the memory 124. With regard to an image guided scale calibration process thought, the instructions are executed to generate configuration settings that are stored in the memory 124, such as scale calibration settings. The configuration settings 128 configure operation of the scanner/scale 108 and the various components therein. For example, the configuration settings 128 may configure speaker 112 volume, display lighting 116 outputs, scan field lighting 120 brightness, decoding algorithm of the imaging device(s) 118 and the instructions, one or more communication protocols used to communicate data from the scanner/scale 108 to a POS system or other system via wired or wireless connections, scale 110 operating parameters (e.g., unit of measure as pounds or kilograms), among other configuration settings the particular scanner/scale 108 of an embodiment may include. In some embodiments, the configuration settings 128 may include a firmware version, a software version, and the like. Thus, when a configuration is set or updated, the setting or updating of the configuration settings 128 may include population and updates of any of the configuration settings 128 of a particular embodiment, including an update to firmware and software present on the scanner.

The scanner/scale 108 may include one or more communication interfaces 114, 132 that enable the scanner/scale 108 to communicate via one or both of wired and wireless connections over a network and with other computing devices. In some embodiments, the communication interface 132 may provide a virtualized communication connection on the scanner/scale 108 that enables the scanner to communicate over a network leveraging network connectivity of a terminal or other computing device with which the scanner is paired, such as a POS terminal.

To calibrate the scale 110 of the scanner/scale 108, a user places the scale 110 in a calibration mode. The scale 110 may be placed in the calibration mode by pressing one or more buttons on the scale 110, scanning a particular barcode, selecting or executing a calibration program or process on a POS terminal, and the like in various embodiments. Once the scale 110 is in the calibration mode, a calibration process is executed. The execution of the calibration process, in some embodiments, is exclusively on the scale 110 (i.e., on the processor 122 of the scanner/scale 108). However, in other embodiments, the calibration process may execute in whole or in part on another device, such as a computer of a POS terminal.

The calibration process is an image guided scale calibration process. At a high-level, the calibration process includes outputting an instruction to a user, such as a voice command output via a speaker 112 of the scanner/scale 108, a speaker connected thereto, or a speaker of another device which may be a speaker of a computer of a POS terminal. The instruction to the user may also, or alternatively, be provided via a display device of the scanner/scale 108 (not illustrated but may also or alternatively include the display lighting 116) or a computer of a POS terminal that may be logically or physically coupled to the scanner/scale 108. In some such embodiments, the user may place the scale 110 in the calibration mode to execute the calibration process via a wired or wireless connection to the scale via a BLUETOOTH®, Near-Field Communication, WI-FI®, Ethernet connection or other such connection from a portable computing device. The portable computing device may be a laptop computer, a mobile device such as a smartphone, tablet, or smartwatch, or other such mobile computing device.

Regardless of how the user places the scale 110 in the calibration mode, the process is essentially the same. The calibration process begins by instructing the user to place a particular weight on a top plate of the scale 110. An imaging device 118, 119 then captures an image of the weight on the scale 110. The image is then processed to identify the weight that has been placed on the scale 110 to verify the weight placed on the scale 110 matches the particular weight the user was instructed to place on the scale 110. The particular weight may be known within the process and verified thereby based on properties of the weight visible in the captured image. Such properties may include the presence of a barcode, shape, words, or other indicia. The properties may also or alternatively include a shape of the weight itself, a measure of one or more dimensions of the weight, an approximate pre-calibrated scale 110 weight of the weight, and the like. To verify the presence of the particular weight, some embodiments may consider just one such property while other embodiments may consider a plurality of these properties. Regardless the calibration process verifies the weight placed on the scale 110 is the particular weight the user was instructed with regard to.

In some embodiments, the calibration process may also instruct the user to place the particular weight in a particular location on the scale 110 top plate. For example, an instruction may be given to place a particular weight in a particular quadrant of the scale 110 top plate, such as a forward or top left corner, or the center of the scale 110 top plate. In some embodiments, the instruction may be to stack a second weight on top of a weight previously placed on the scale 110 top plate. Regardless, the image as discussed above in such embodiments is further processed to verify not only that the proper weight has been placed on the scale 110 top plate, but also to verify the weight was placed at the instructed location.

In some embodiments, when the processing of a captured image finds that the incorrect weight has been placed on the scale 110, a corrective instruction may be provided to the user. In some other embodiments, when the weight is improper but the weight can be identified based on the properties thereof, the calibration process may determine whether a portion of the calibration process with regard to the incorrect weight has yet to be performed. If so, the calibration process may continue with regard to that weight to simplify the calibration process for the user. This may further include verifying the location of the improper weight on the scale 110 top place with regard to the calibration process.

Similarly, when the proper weight is on the scale 110 but has been placed incorrectly, the actual location of the weight may be considered to determine whether a portion of the calibration process with the weight at that location is part of the calibration process and has yet to be performed. In such instances, that portion of the calibration process may then be executed.

However, if the weight or its location are improper, and in embodiments where the calibration process is unable self-correct as described in the preceding two paragraphs, the calibration process will provide a corrective instruction to the user to move the weight to the proper location, use the proper weight, or both.

When the weight placed on the scale 110 top plate is correct, the calibration process continues. This may include providing an instruction to the user to press a button or buttons on the scale 110, such as a "zero" button, or to preform additional tasks. The scale 110 will then store data in configuration settings 128 of the scanner/scale 108 or of the scale 110 itself. The calibration process will then continue to a next step with regard to another location on the scale 110 top plate or a different weight or combination of weights.

Figure 2:
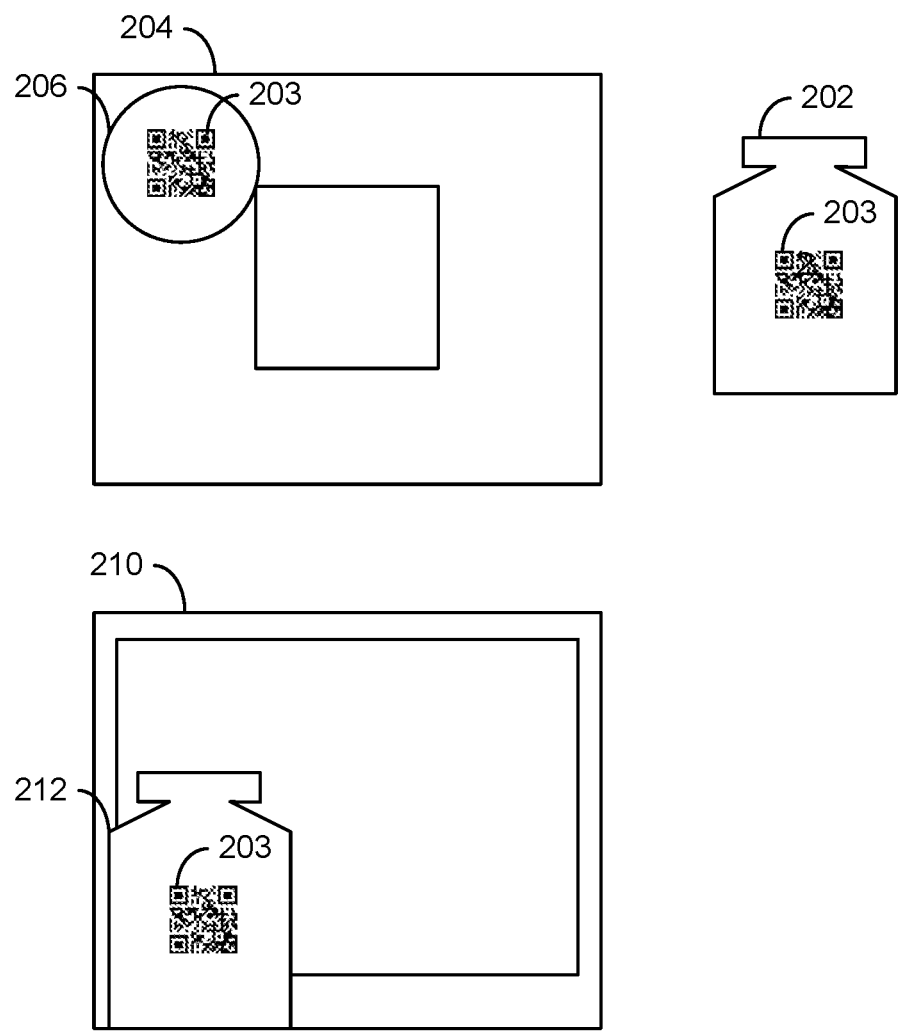
FIG. 2 illustrates a weight and perspective images of scan fields of a scanner/scale within which the weight is present, according to some example embodiments.

FIG. 2 illustrates a weight 202 and perspective images 204, 210 of scan fields of a scanner/scale 110 within which the weight 202 is present, according to some example embodiments. The weight 202 is numbered 206 and 212 in the images 204, 210, respectively.

The weight 202 has properties that are perceptible in the captured images 204, 210. For example, the weight 202 may include a barcode, such as a Quick Response (QR) Code 203 that is specific to the particular weight. The barcode may alternatively be a more standard one-dimensional barcode in other embodiments. Other symbols and colors may also or alternatively be associated with the weight 202 as well as unique shapes, colors, and dimensions of the weight 202 that assist the calibration process in identifying the particular weight. Certain properties, such as the QR Code 203 may be present on multiple surface of the weight 202. For example, as illustrated the QR Code 203 is present on the side of the weight 202 and on top of the weight 202 as illustrated by the weight 206 within the image 204.

As modern product scanners, such as the scanner 108 of the scanner/scale 110 of FIG. 1 include one or more cameras, images are captured in the various embodiments herein as part of the scale calibration process. The image 204 shows the weight 206 located at the top left-hand corner of the scale top plate. This location may be used to determine whether the weight 206 has been properly placed according to an instruction given to the user as discussed above. Similarly, the weight 206 present on the scale top plate can be confirmed based on the properties of the weight 206, such as the QR Code 203. The image 210 is a different perspective of the weight 212 on the scale top plate by another camera that is either part of the scanner/scale 110, coupled thereto, or is otherwise in communication therewith, such as the camera 119 of FIG. 1. When multiple image 204, 210 perspectives are available, such embodiments are able to verify a location of a weight on the scale top plate with greater accuracy, although such great accuracy is not required in all embodiments.

Figure 3:
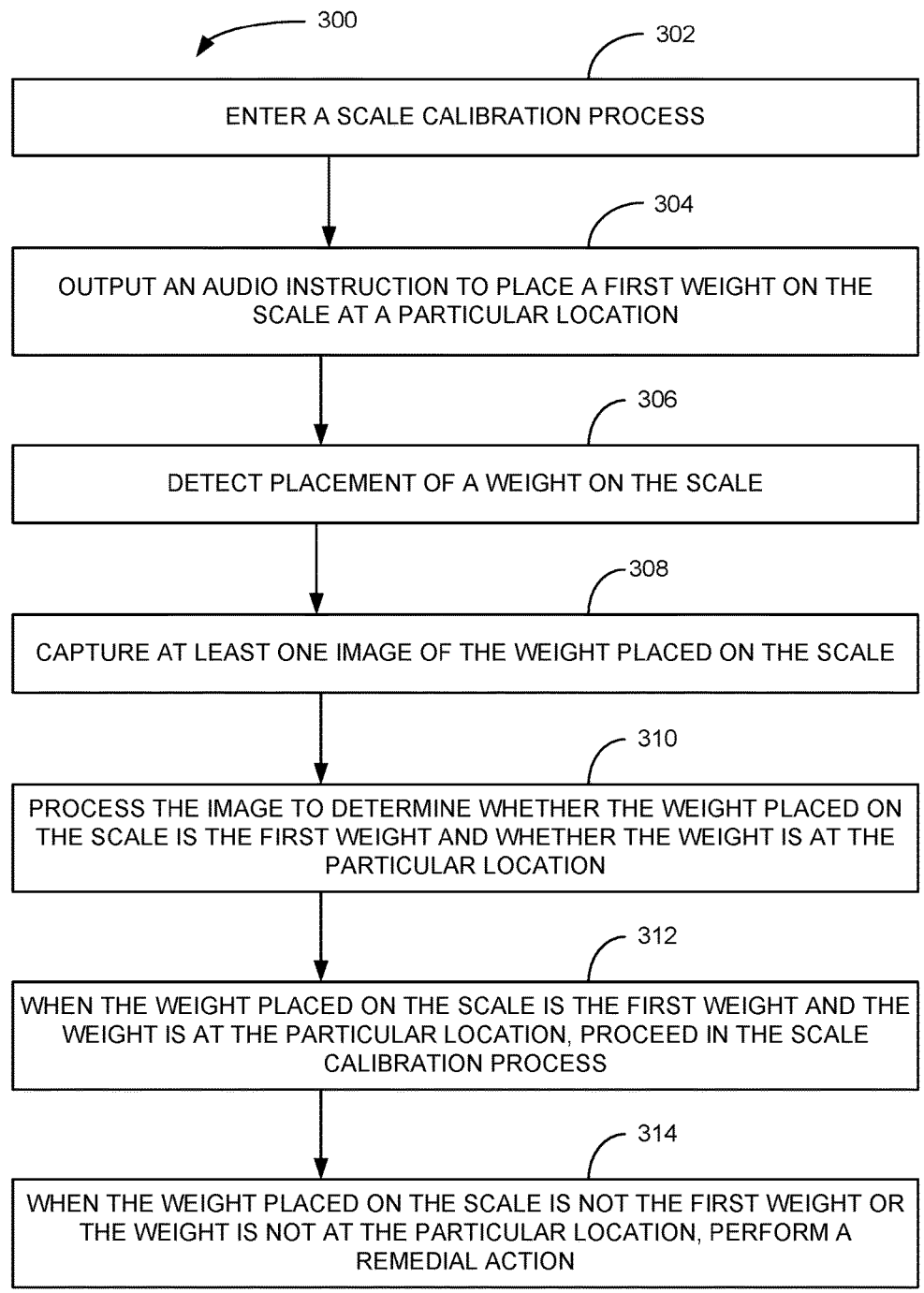
FIG. 3 is a block flow diagram of a method, according to an example embodiment.

FIG. 3 is a block flow diagram of a method 300, according to an example embodiment. The method 300 is an example of a method that may be executed by the processor 122 of the scanner/scale 108 of FIG. 1, by a processor of a scale itself, by a processor of a POS terminal coupled to a scale, by a portable computing device that communicates with a scale, and the like as discussed elsewhere herein.

The method 300 includes entering 302 a scale calibration process and outputting 304 an instruction, such as an audible voice instruction, to place a first weight on the scale at a particular location. The method 300 then detects 306 placement of a weight on the scale and captures 308 at least one image of the weight placed on the scale. The method 300 continues by processing 310 the image to determine whether the weight placed on the scale is the first weight and whether the weight is at the particular location. In such embodiments, when the weight placed on the scale is the first weight and the weight is at the particular location, the method 300 proceeds 312 in the scale calibration process. When the weight placed on the scale is not the first weight or the weight is not at the particular location, the method 300 includes performing 314 a remedial action.

In some embodiments of the method 300, performing 314 the remedial action, when the weight placed on the scale is not the first weight, includes outputting an audio instruction to remove the weight and to place the first weight at the particular location. In further embodiments of the method 300, performing 314 the remedial action, when the weight placed on the scale is not the first weight, includes determining whether a second weight has been placed on the scale based on at least one property of the second weight defined in data stored in a memory device of the scale. When the second weight is identified, the method 300 performs a scale calibration process operation with regard to the second weight. In yet another embodiment of the method 300, performing 314 the remedial action of the scale calibration process, when the weight placed on the scale is not at the particular location, includes outputting an audio instruction to move the weight to the particular location.

In some embodiments of the method 300, the first weight has at least one property defined in data stored in a memory device of the scale that are identifiable in an image. In such an embodiment, the method 300 processing 310 the captured at least one image to determine whether the weight placed on the scale is the first weight includes determining whether the at least one property of the first weight defined in the stored data is present within the captured at least one image. The at least one property of the first weight defined in the stored data may include one or more of data representative of at least one of a color, at least one dimension measure, a shape, a barcode, a value represented in a barcode, and among other properties that may be present within a captured 308 image.

In some embodiments of the method 300, proceeding 312 in the scale calibration process includes storing a calibration setting in a memory of the scale based on a weight measure by the scale of the weight placed thereon and outputting a further audio instruction to either move the weight to another particular location or to place a second weight at a further particular location. Proceeding 312 may also or alternatively include outputting an indication the scale calibration process has completed when there are no further calibration tasks to be completed.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
outputting an instruction to place a first weight on a scale being calibrated at a particular location;
capturing at least one image of the weight when placed on the scale;
processing a captured image of a weight when placed on the scale to determine whether the weight is the first weight and whether the weight is at the particular location; and
when the weight placed on the scale is not the first weight or the weight is not at the particular location, performing a remedial action.

2. The method of claim 1, when the weight is the first weight and is at the particular location, proceeding in the scale calibration process.

3. The method of claim 1, wherein the instruction is output as an audio instruction from a speaker of the scale.

4. The method of claim 1, wherein performing the remedial action, when the weight placed on the scale is not the first weight, includes outputting an instruction to remove the weight and to place the first weight at the particular location.

5. The method of claim 1, wherein:
the first weight has at least one property defined in data stored in a memory device of the scale that is identifiable in an image; and
processing the captured at least one image to determine whether the weight placed on the scale is the first weight includes determining whether the at least one property of the first weight defined in the stored data is present within the captured at least one image.

6. The method of claim 5, wherein the at least one property of the first weight defined in the stored data includes data representative of at least one of a color, at least one dimension measure, a shape, a barcode, and a value represented in a barcode.

7. The method of claim 1, wherein performing the remedial action, when the weight placed on the scale is not the first weight, includes:
determining whether a second weight has been placed on the scale based on at least one property of the second weight defined in data stored in a memory device of the scale; and
when the second weight is identified, performing a scale calibration process operation with regard to the second weight.

8. A method comprising:
entering a scale calibration process;
outputting an audio instruction to place a first weight on the scale at a particular location;
detecting placement of a weight on the scale;
capturing at least one image of the weight placed on the scale;
processing the image to determine whether the weight placed on the scale is the first weight and whether the weight is at the particular location;
when the weight placed on the scale is the first weight and the weight is at the particular location, proceeding in the scale calibration process; and
when the weight placed on the scale is not the first weight or the weight is not at the particular location, performing a remedial action.

9. The method of claim 8, wherein performing the remedial action, when the weight placed on the scale is not the first weight, includes outputting an audio instruction to remove the weight and to place the first weight at the particular location.

10. The method of claim 8, wherein performing the remedial action, when the weight placed on the scale is not the first weight, includes:
determining whether a second weight has been placed on the scale based on at least one property of the second weight defined in data stored in a memory device of the scale; and
when the second weight is identified, performing a scale calibration process operation with regard to the second weight.

11. The method of claim 8, wherein performing the remedial action of the scale calibration process, when the weight placed on the scale is not at the particular location, includes outputting an audio instruction to move the weight to the particular location.

12. The method of claim 8, wherein:
the first weight has at least one property defined in data stored in a memory device of the scale that are identifiable in an image; and
processing the captured at least one image to determine whether the weight placed on the scale is the first weight includes determining whether the at least one property of the first weight defined in the stored data is present within the captured at least one image.

13. The method of claim 12, wherein the at least one property of the first weight defined in the stored data includes data representative of at least one of a color, at least one dimension measure, a shape, a barcode, and a value represented in a barcode.

14. The method of claim 8, wherein proceeding in the scale calibration process includes:
storing a calibration setting in a memory of the scale based on a weight measure by the scale of the weight placed thereon; and
outputting a further audio instruction to either move the weight to another particular location or to place a second weight at a further particular location.

15. A scale device comprising:
a scale;
a processor and a memory;
at least one imaging device;
an output device; and
scale calibration process instructions stored in the memory and executable by the processor to perform data processing activities comprising:
outputting an instruction via the output device to place a first weight on the scale at a particular location;
capturing at least one image by the at least one imaging device of the weight when placed on the scale;
processing a captured image of a weight when placed on the scale to determine whether the weight is the first weight and whether the weight is at the particular location;
when the weight placed on the scale is not the first weight or the weight is not at the particular location, performing a remedial action; and
when the weight is the first weight and is at the particular location, proceeding in the scale calibration process.

16. The scale device of claim 15, wherein the output device is a speaker and the instruction is output as an audio instruction from the speaker.

17. The scale device of claim 15, wherein performing the remedial action, when the weight placed on the scale is not the first weight, includes outputting an instruction via the output device to remove the weight and to place the first weight at the particular location.

18. The scale device of claim 15, wherein:
the first weight has at least one property defined in data stored in the memory that is identifiable in a captured image; and
processing the captured at least one image to determine whether the weight placed on the scale is the first weight includes determining whether the at least one property of the first weight defined in the stored data is present within the captured at least one image.

19. The method of claim 18, wherein the at least one property of the first weight defined in the stored data includes data representative of at least one of a color, at least one dimension measure, a shape, a barcode, and a value represented in a barcode.

20. The method of claim 15, wherein performing the remedial action, when the weight placed on the scale is not the first weight, includes:
determining whether a second weight has been placed on the scale based on at least one property of the second weight defined in data stored in the memory, the at least one property of the second weight defined in the stored data includes data representative of at least one of a color, at least one dimension measure, a shape, a barcode, and a value represented in a barcode; and
when the second weight is identified, performing a scale calibration process operation with regard to the second weight.

* * * * *